(12) United States Patent
Wang (10) Patent No.: US 12,399,628 B2
(45) Date of Patent: Aug. 26, 2025

(54) METHOD AND APPARATUS OF PERFORMING GRACEFUL THERMAL SHUTDOWN IN SOLID STATE DRIVES

(71) Applicant: SK hynix Inc., Gyeonggi-do (KR)

(72) Inventor: Wenwei Wang, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 14 days.

(21) Appl. No.: 18/409,175

(22) Filed: Jan. 10, 2024

(65) Prior Publication Data

US 2025/0224881 A1 Jul. 10, 2025

(51) Int. Cl.
*G06F 3/06* (2006.01)
*G06F 1/3221* (2019.01)

(52) U.S. Cl.
CPC .......... *G06F 3/0619* (2013.01); *G06F 1/3221* (2013.01); *G06F 3/0656* (2013.01); *G06F 3/0679* (2013.01)

(58) Field of Classification Search
CPC .... G06F 3/0619; G06F 1/3221; G06F 3/0656; G06F 3/0679
See application file for complete search history.

(56) References Cited

U.S. PATENT DOCUMENTS

| 10,013,194 | B1* | 7/2018 | Yang | G06F 3/0652 |
| 2009/0315665 | A1* | 12/2009 | Hoult | G06F 1/206 337/298 |
| 2022/0300171 | A1* | 9/2022 | Linnen | G06F 1/266 |
| 2023/0315313 | A1* | 10/2023 | Gunda | G06F 3/0616 711/154 |
| 2023/0367377 | A1* | 11/2023 | Vaysman | G06F 1/26 |
| 2023/0367378 | A1* | 11/2023 | Vaysman | G06F 1/3221 |
| 2023/0367379 | A1* | 11/2023 | Vaysman | G06F 1/324 |

FOREIGN PATENT DOCUMENTS

KR 2021-0069744 A * 6/2021 ............... G06F 3/06

* cited by examiner

*Primary Examiner* — Tasnima Matin
(74) *Attorney, Agent, or Firm* — IP & T GROUP LLP (57) ABSTRACT

A method, system, and control for thermal shutdown of a storage device. The method and control determine that a temperature of the storage device is approaching a critical temperature; disable input power to the storage device upon determining that the temperature is approaching the critical temperature; when the input power to the storage device is disabled, power the storage device with auxiliary power; and under the auxiliary power, transfer data from a buffer in the storage device to a memory of the storage device.

20 Claims, 6 Drawing Sheets

METHOD AND APPARATUS OF PERFORMING GRACEFUL THERMAL SHUTDOWN IN SOLID STATE DRIVES

BACKGROUND

1. Field

Embodiments of the present disclosure relate to circuits for systems and devices, particularly high density storage devices, and a method of operating the circuits.

2. Description of the Related Art

The computer environment paradigm has shifted to ubiquitous computing that can be used virtually anytime and anywhere. As a result, the use of portable electronic devices, such as mobile phones, digital cameras, and notebook computers has rapidly increased. These portable electronic devices generally use a memory system having memory device(s), that is, data storage device(s). A data storage device is used as a main memory device or an auxiliary memory device of the portable electronic devices.

Data storage devices used as memory devices provide excellent stability, durability, high information access speed, and low power consumption, since they have no moving parts. Examples of data storage devices having such advantages include universal serial bus (USB) memory devices, memory cards having various interfaces, and SSDs.

SSDs can generate a significant amount of heat during operation. For example, a controller of an SSD may be instructed (e.g., by a host device) to execute a series of memory operations (e.g., read, write, etc.) with respect to one or more non-volatile memory devices. Rapid execution of these memory operations to meet the performance demands of the host may cause excess heat to build up in the SSD. Such excess heat may raise the temperature of the SSD to a critical temperature (e.g., a temperature at which the SSD shuts off to prevent damage to the components of the SSD), thereby negatively impacting SSD performance.

Thermal throttling allows SSD operation within a temperature constraint while attempting to maximizing performance. High performance consumes high power, which in turn dissipates heat that can cause the system to reach a critical temperature, where the SSD may be powered off. These high temperature events can occur quickly and thereby cause an ungraceful shutdown of the SSD.

In this context, embodiments of the present invention arise.

SUMMARY

Embodiments of the present invention provide a method for managing thermal shutdown of a storage device. The method includes determining that a temperature of the storage device is approaching a critical temperature; disabling input power to the storage device upon determining that the temperature is approaching the critical temperature; when the input power to the storage device is disabled, powering the storage device with auxiliary power; and under the auxiliary power, transferring data from a buffer in the storage device to a memory of the storage device.

Other embodiments of the present invention provide a system for thermal shutdown of a storage device. The system includes a control circuit for controlling the thermal shutdown of the storage device. The control circuit is configured to: determine that a temperature of the storage device is approaching a critical temperature; disable input power to the storage device upon determining that the temperature is approaching the critical temperature; when the input power to the storage device is disabled, power the storage device with auxiliary power; and under the auxiliary power, transfer data from a buffer in the storage device to a memory of the storage device.

Still other embodiments of the present invention provide a control for managing thermal shutdown of a storage device. The control comprises a controller configured to determine that a temperature of the storage device is approaching a critical temperature; disable input power to the storage device upon determining that the temperature is approaching the critical temperature; when the input power to the storage device is disabled, power the storage device with auxiliary power; and under the auxiliary power, transfer data from a buffer in the storage device to a memory of the storage device.

Additional aspects of the present invention will become apparent from the following description.

DETAILED DESCRIPTION

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The invention encompasses numerous alternatives, modifications and equivalents. Numerous specific details are set forth in the following description in order to provide a thorough understanding of the invention. These details are provided for the purpose of example; the invention may be practiced without some or all of these specific details. For clarity, technical material that is known in technical fields related to the invention has not been described in detail so that the invention is not unnecessarily obscured.

Figure 1:
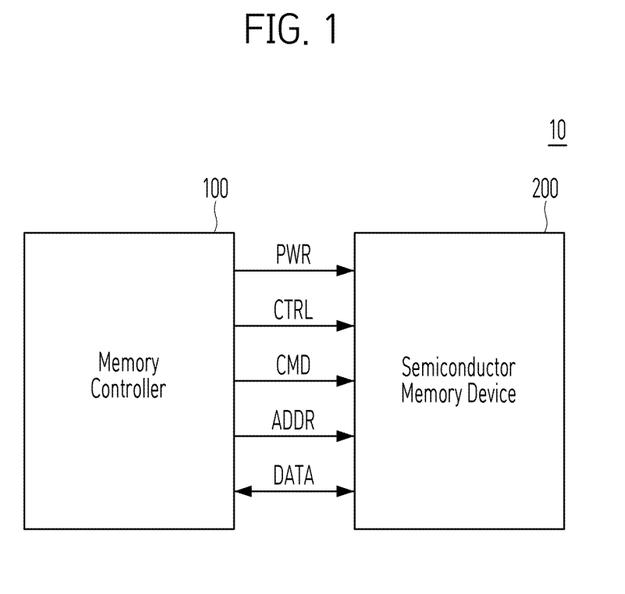
FIG. 1 is a block diagram illustrating a memory system in accordance with an embodiment of the present invention.

FIG. 1 is a block diagram schematically illustrating a memory system 10 in accordance with an embodiment of the present invention.

Referring to FIG. 1, the memory system 10 may include a memory controller 100 and a semiconductor memory device 200, which may represent more than one such device. The semiconductor memory device(s) 200 may be flash memory device(s), particularly of the NAND-type. For brevity, memory controller 100 and semiconductor memory device 200 are sometimes simply referred to below as controller 100 and memory device 200, respectively.

The controller 100 may control overall operations of the memory device 200.

The memory device 200 may perform one or more erase, program, and read operations under the control of the memory controller 100. The memory device 200 may receive a command CMD, an address ADDR and data DATA through input/output (I/O) lines. The memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as an SSD (as noted above). The SSD may include a storage device for storing data therein.

In another embodiment, the memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC) card, and/or a universal flash storage (UFS).

In still another embodiment, the memory system 10 may be provided as one of various components in an electronic device, such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
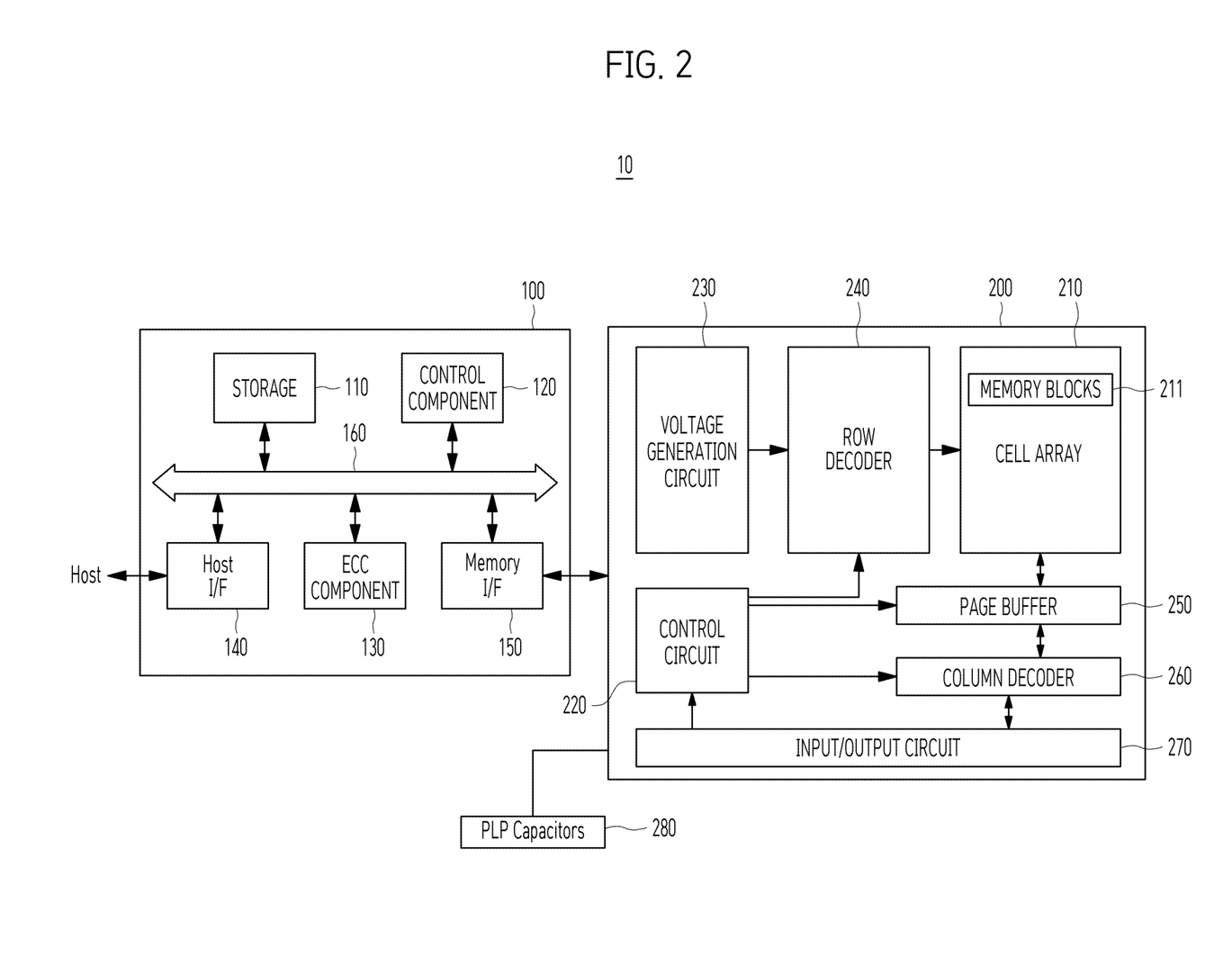
FIG. 2 is a block diagram illustrating a memory system in accordance with an embodiment of the present invention.

FIG. 2 is a detailed block diagram illustrating a memory system in accordance with another embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented as any of various types of electronic devices. In some embodiments, the host device may include an electronic device, such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device, such as a mobile phone, a smart phone, an e-book, an MP3 player, a portable multimedia player (PMP), and/or a portable game player.

The memory device 200 may store data to be accessed by the host device.

The memory device 200 may be implemented as a volatile memory device, such as a dynamic random access memory (DRAM) and/or a static random access memory (SRAM) or a non-volatile memory device, such as a read only memory (ROM), a mask ROM (MROM), a programmable ROM (PROM), an erasable programmable ROM (EPROM), an electrically erasable programmable ROM (EEPROM), ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor, e.g., a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented as a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations, such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure to correct the error bits.

The ECC component 130 may perform an error correction operation based on a coded modulation, such as a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a block coded modulation (BCM). The ECC component 130 may include any and all circuits, systems or devices for suitable error correction operation, in accordance with embodiments of the present invention.

The host interface 140 may communicate with the host device through one or more of various interface protocols, such as a universal serial bus (USB), a multi-media card (MMC), a peripheral component interconnect express (PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the memory controller 100 and the memory device 200 to allow the memory controller 100 to control the memory device 200 in response to a request from the host device. The memory interface 150 may generate control signals for the memory device 200 and process data under the control of the control component or CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer (array) 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
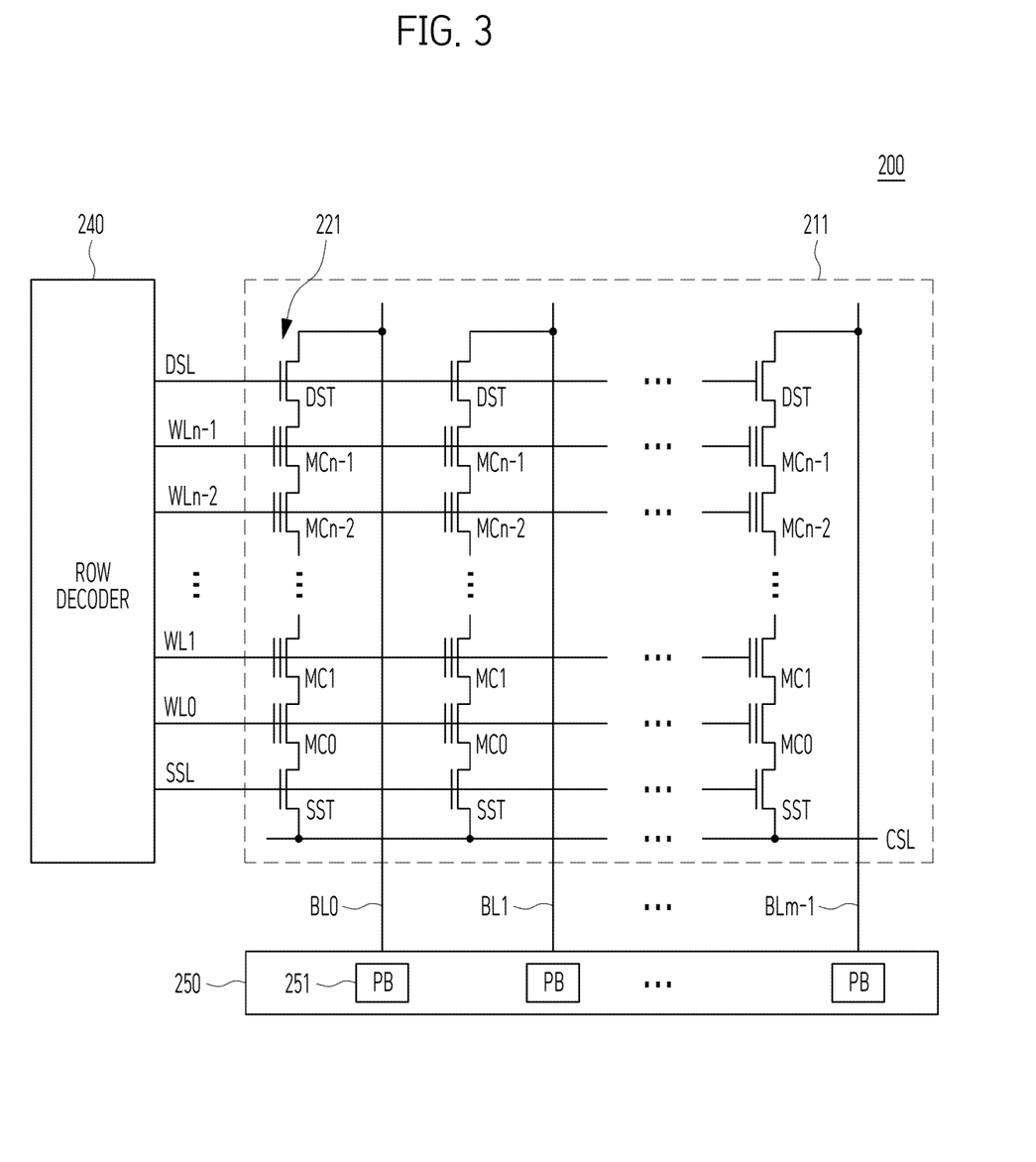
FIG. 3 is a circuit diagram illustrating a memory block of a memory device of a memory system in accordance with an embodiment of the present invention.

The page buffer (array) 250 may be in electrical communication with the memory cell array 210 through bit lines BL (shown in FIG. 3). The page buffer (array) 250 may pre-charge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer (array) 250, and may also exchange data with the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the memory block 211 may include a plurality of word lines WL0 to WLn-1, a drain select line DSL and a source select line SSL coupled to the row decoder 240. These lines may be arranged in parallel with the plurality of word lines between the DSL and SSL.

The memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

As previously noted, the page buffer 250 may be in the form of a page buffer array including a plurality of page buffers 251 that are coupled to the bit lines BL0 to BLm-1. The page buffers 251 may operate in response to page buffer control signals. For example, the page buffers 251 may temporarily store data received through the bit lines BL0 to BLm-1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

As noted above, SSDs implement thermal throttling mechanisms which keep the SSDs internal temperature within acceptable levels at which the SSDs internal components will not be thermally damaged due to high temperature. The relationship between SSDs temperature and performance can be established, for example high performance consumes more power and hence increases the temperature. To reduce the temperature, the SSDs power consumption needs to be reduced, thus the performance needs to be reduced. In general, the SSD's firmware controls the thermal throttling and reduces the SSDs temperature in sacrifice of the SSDs performance when it becomes necessary.

However, if the SSDs temperature continues upward even though the SSDs performance is minimized, the inventors have observed that system on chip (SoC), dynamic read access memory (DDR) buffers, and NAND memory components, or even the DC-DC converters (to supply powers to those components) can stop functioning properly or become damaged more or less due to the fact that their operating temperature exceeds their allowed absolute maximum operating temperature.

On the other hand, unlike the Hard Disk Drives (HDDs), SSDs need to protect against data loss in the DDR buffer (such as in storage 110 of FIG. 2). The protection is vital because the DDR data contains the physical address mapping information for the user data stored in the media of NAND flash memory. The data location changes dynamically though the mechanism called write levelling which is to make the usage of the NAND flash memory media evenly to prolong its life time. Without the address mapping information, the user data become unrecoverable from SSDs. During the normal SSDs operation, when the host main power failure is detected, the SSDs switch to use the power from PLP (Power Loss Protection) capacitors as the temporary energy source for short period of time for firmware to flush the necessary information data from the DDR buffer to NAND flash memory. But if any of the internals components are not functioning or damage occurs due to high temperature, a user data flush may not be performed, and hence data may be lost.

A method and apparatus for SSDs to perform a graceful thermal shutdown is described below. When such an extreme over-temperature event occurs, this method implements a graceful thermal shutdown, which guarantees the following two protections: protection of the SSDs internal components from thermal damage; and further protection of the user data loss from over temperature conditions.

As a result, the SSDs will still continue to work normally without any component damage and data loss under such a graceful thermal shutdown mechanism can be avoided.

Figure 4:
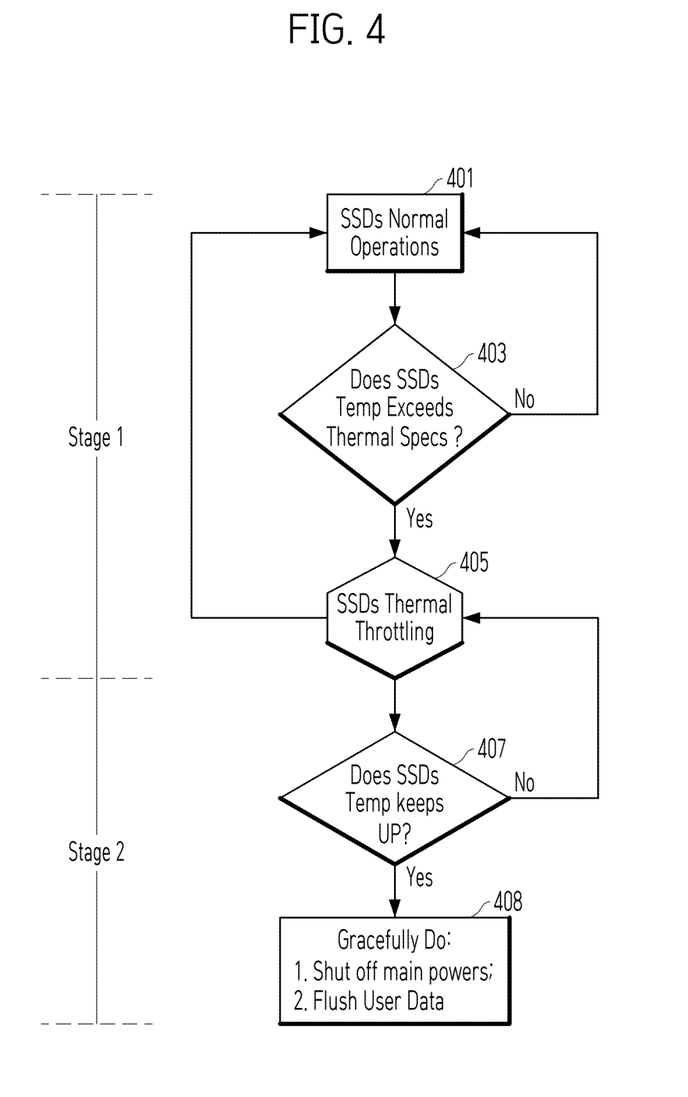
FIG. 4 is a flow chart illustrating the inventive SSD thermal control.

FIG. 4 shows in a flow chart format the inventive SSD thermal control. The inventive control in one embodiment is divided into two thermal control stages. Stage 1 represents conventional SSD control, while the Stage 2 represents the advancements of the present invention.

Stage 1: Thermal Throttling Control

At 401, the SSDs firmware determines if normal operations exist. During operations, (at 403) if the SSDs temperature reaches or exceeds to a pre-determined thermal level (e.g., which may be programmed in the SSD control), the SSDs firmware will force the SSDs to enter a thermal throttling process (at 405), and the SSDs firmware reduces the SSDs performance to cool off the SSDs. There may be several levels between the SSD performance reduction and realized temperature reduction. If the temperature is ultimately reduced to the normal level through the thermal throttling process, the SSDs will return back to the normal operations (return to 401) with full performance.

Stage 2: Thermal Shutdown Control—A Graceful Method

If the SSDs temperature continues to increase even after the SSD performance has been reduced to the minimum, firmware will force the SSDs to enter a graceful thermal shutdown, where the main power will be disabled and the user data will be safely moved to flash media (e.g., to memory device 210) under the auxiliary power provided e.g., by PLP capacitors 280 (shown in FIG. 2), and the SSD components will be protected from over-heating damage.

Details of a "graceful" thermal shutdown control of stage 2 are provided below.

Absolute Maximum Smart Temperature (AMST). At this temperature, one or more SSDs internal components may reach to, but not exceeds, its absolute maximum temperature.

Graceful Thermal Shutdown Temperature (GTST): At this temperature, the graceful thermal shutdown is triggered. In one embodiment, GTST has a margin relative to AMST, where the temperature gap is used for the SSD firmware to have sufficient time to transfer all necessary information data from the DDR buffer (such as a storage 110 of FIG. 2) into the NAND flash media comprising memory 210, supported by the PLP (power loss protection) capacitor energy.

The AMST in this embodiment represents a single value, although the internal components could have different absolute maximum temperature values specified in their datasheets from component manufacturers. In one embodiment, the AMST is obtained through SSDs level of thermal experiments, and the result can be expressed by the formula shown below, which establishes the correct relationship between AMST of the SSDs and the absolute maximum temperatures of the internal components to be protected.

$$AMST = a_0 T_0 + a_1 T_1 + a_2 T_2 + \ldots + a_N T_N + \alpha$$

where $a_0, a_1, a_2 \ldots a_N$ are constants obtained through the thermal experiments, and where $T_0, T_1, T_2 \ldots T_N$ are the actual maximum temperatures of the respective internal components which are to be thermally protected, such as SoC, DDR, NAND, Buck (a power conversion device of voltage generation circuit 230) and etc. and a is a calculated constant used to fit the formula. Accordingly, in one embodiment, the AMST for the SSD is calculated based on scaling respective actual maximum temperatures of respective storage device components.

The GTST may also be represented by a single value, which triggers the data transfer to flash media 290. By the time that all data has been safely transferred into the flash media 29, in this embodiment, the SSDs temperature would not have exceeded the AMST, hence GTST=β% AMST, where β is a constant obtained through drive level experimentation confirming data protection. The time to transfer the data to the flash media 209 (in one embodiment) is shorter than the time for the SSD temperature to rise to AMST. In one embodiment, the constant β ranges from 50 to 100 (or any intermediate range), or ranges from 70 to 90, or ranges from 80 to 95.

Figure 5:
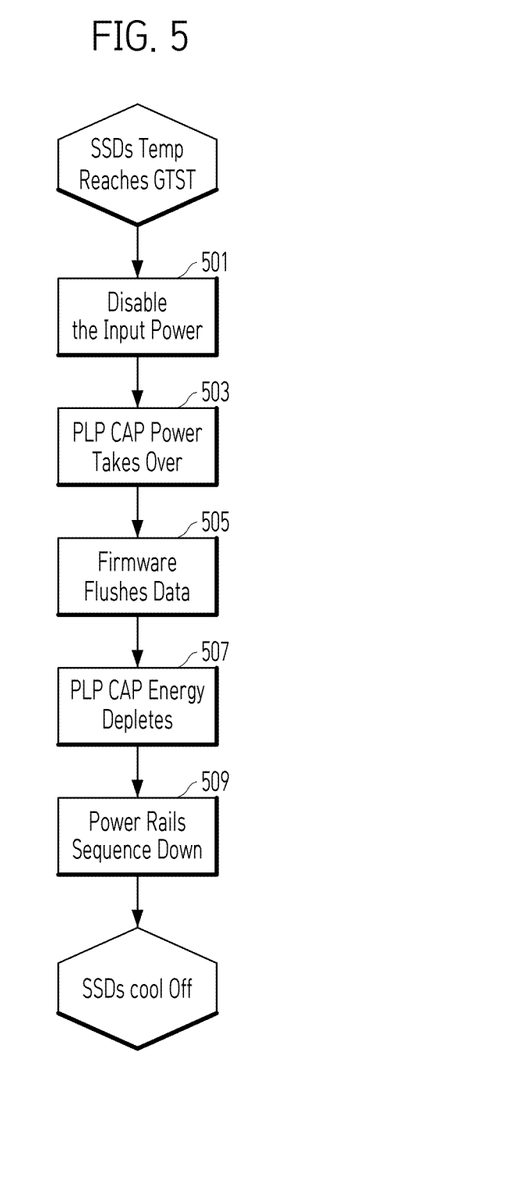
FIG. 5 is a flow chart illustrating a SSDs graceful thermal shutdown.

FIG. 5 shows a flow chart of the SSDs Graceful Thermal Shutdown. The shutdown process is triggered when the SSD reaches GTST. Modern SSDs power circuits have a main input power monitoring function. At 501, the power to the SSDs is disabled. When the main power to any of the SSDs from the host is lost, (at 503) the power circuit will switch the power source from the main input power to the reserved (or auxiliary) power supplied by PLP capacitors 280. Meanwhile, the power circuit will send a PLP signal to the SoC so that firmware can immediately start to flush (transfer) the data (at 505). At the end when the PLP energy is depleted (at 507), the voltage generation circuit for the SSD (e.g., control circuit 230) will perform power shutdown according to a pre-determined sequence, that is the power rails sequence down (at 509), and thereby the SSDs at GTST cool down.

According to one embodiment, the firmware monitors for the GTST event. When the GTST temperature is reached, the firmware disables the main input power which transfers the GTST event into a main power loss event. As a result, the SSD gracefully completes the thermal shutdown, while completing data transfer from storage 110 to memory 210 under the PLP capacitor power; and therefore, user data is protected from loss under the graceful thermal shutdown.

Figure 6:
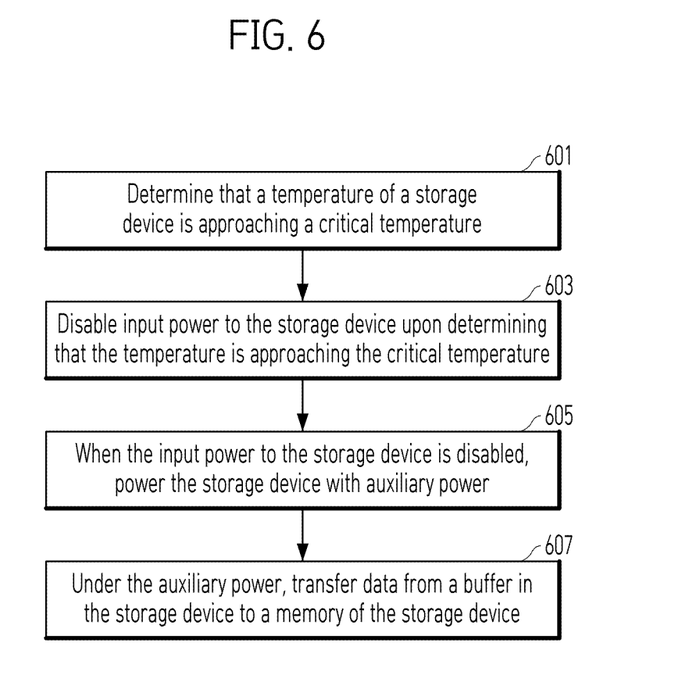
FIG. 6 is a flow chart illustrating the inventive method for managing thermal shutdown of a storage device, according to one embodiment of the present invention.

According to one embodiment of the invention, there is provided a method for thermal shutdown of a storage device as illustrated in FIG. 6. At 601, the method determines that a temperature of a storage device is approaching a critical temperature. At 603, the method disables input power to the storage device upon determining that the temperature is approaching the critical temperature. At 605, when the input power to the storage device is disabled, powers the storage device with auxiliary power. At 607, under the auxiliary power, the method transfers data from a buffer in the storage device to a memory of the storage device. For example, the data may be transferred to memory device 210.

The method in one embodiment further includes determining for the critical temperature an absolute maximum smart temperature AMST for the storage device. Here, the AMST can be calculated based on scaling respective maximum temperatures of respective storage device components of the storage device. More specifically, AMST can be calculated based on the following:

$$AMST = a_0T_0 + a_1T_1 + a_2T_2 + \ldots + a_NT_N + \alpha$$

where $a_0, a_1, a_2 \ldots a_N$ are constants, $T_0, T_1, T_2 \ldots T_N$ are the respective actual maximum temperatures of the respective storage device components of the storage device. and $\alpha$ is a constant.

In one embodiment of this method, the disabling the input power occurs when the temperature of the storage device ranges from 70% to 90% of the AMST, or the disabling the input power occurs when the temperature of the storage device ranges from 80% to 95% of the AMST or the disabling the input power occurs when a predicted time before reaching the AMST provides a duration for transfer of the data from the buffer to the memory of the storage device.

In one embodiment of this method, the powering storage device with auxiliary power comprises powering the storage device with power from power loss protection capacitors (e.g., from PLP capacitors 280 in FIG. 2).

In one embodiment of this method, the transferring data comprises transferring the data to flash media comprising the memory, thereby protecting the data from loss.

In one embodiment of this method, the disabling the input power to the storage device, the powering the storage device with auxiliary power, and the transferring data from the storage device protects components of the storage device from over-heating damage while preventing loss of user data, thus proving a graceful shutdown.

Various additional steps may be performed depending on the specific configuration and conditions occurring.

Other embodiments of the present invention provide a system for thermal shutdown of a storage device (e.g., storage 210 in FIG. 2). The system includes a control circuit (e.g., control circuit 220 in FIG. 2) for controlling the thermal shutdown of the storage device. The control circuit is configured to: determine that a temperature of a storage device is approaching a critical temperature; and disable input power when the temperature is approaching the critical temperature. The control circuit is configured to: when the input power to the storage device is disabled, power the storage device with auxiliary power, and under the auxiliary power, to transfer data from a buffer (e.g., buffer in FIG. 2) in the storage device to a memory (e.g., memory in FIG. 2).

The control circuit in one embodiment is configured to determine for the critical temperature an absolute maximum smart temperature AMST for the storage device. Here, AMST can be calculated based on scaling respective maximum temperatures of respective storage device components of the storage device. More specifically, AMST can be calculated based on the following:

$$AMST = a_0T_0 + a_1T_1 + a_2T_2 + \ldots + a_NT_N + \alpha$$

where $a_0, a_1, a_2 \ldots a_N$ are constants, $T_0, T_1, T_2 \ldots T_N$ are the respective actual maximum temperatures of the respective storage device components of the storage device. and $\alpha$ is a constant.

The control circuit in one embodiment is configured to disable the input power when the temperature of the storage device ranges from 70% to 90% of the AMST, or disable the input power when the temperature of the storage device ranges from 80% to 95% of the AMST or thermally throttle when a predicted time before reaching the absolute temperature provides a duration for transfer of the data from a buffer to a memory of the storage device.

The control circuit in one embodiment is configured to power the storage device with power from power loss protection capacitors (e.g., from PLP capacitors 280 in FIG. 2).

The control circuit in one embodiment is configured to transfer the data to a flash media comprising the memory, thereby protecting the data from loss.

In another embodiment of the present invention, there is provided a control for thermal shutdown of a storage device. The control comprises a controller configured to determine that a temperature of a storage device is approaching a critical temperature, and to thermally throttle the storage device when the temperature is approaching a critical temperature. if the temperature continues to rise after thermally throttling and input power to the storage device is disabled, the controller is configured to power the storage device with auxiliary power, and under the auxiliary power, to transfer data from a buffer in the storage device to a memory of the storage device.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

What is claimed is:

1. A method for thermal shutdown of a storage device, comprising:
   determining that a temperature of the storage device is approaching a critical temperature;
   disabling input power to the storage device upon determining that the temperature is approaching the critical temperature;
   when the input power to the storage device is disabled, powering the storage device with auxiliary power; and
   under the auxiliary power, transferring data from a buffer in the storage device to a memory of the storage device,
   wherein
   the input power is disabled prior to the storage device reaching the critical temperature, and
   the data is transferred during a time margin before the storage device reaches the critical temperature.

2. The method of claim 1, wherein the determining comprises determining for the critical temperature an absolute maximum smart temperature AMST for the storage device.

3. The method of claim 2, wherein the AMST is calculated based on scaling respective maximum temperatures of respective storage device components of the storage device.

4. The method of claim 2, wherein the AMST is calculated based on the following:

$$AMST = a_0 T_0 + a_1 T_1 + a_2 T_2 + \ldots + a_N T_N + \alpha$$

where $a_0, a_1, a_2 \ldots a_N$ are constants, $T_0, T_1, T_2 \ldots T_N$ are the respective actual maximum temperatures of the respective storage device components of the storage device, and $\alpha$ is a constant.

5. The method of claim 2, wherein the disabling the input power occurs when the temperature of the storage device ranges from 70% to 90% of the AMST.

6. The method of claim 2, wherein the disabling the input power occurs when the temperature of the storage device ranges from 80% to 95% of the AMST.

7. The method of claim 2, wherein the disabling the input power occurs when a predicted time before reaching the AMST provides a duration for transfer of the data.

8. The method of claim 1, wherein the powering storage device with auxiliary power comprises powering the storage device with power from power loss protection capacitors.

9. The method of claim 1, wherein the transferring data comprises transferring the data to a flash media comprising the memory, thereby protecting the data from loss.

10. The method of claim 1, wherein the disabling input power to the storage device, the powering the storage device with auxiliary power, and the transferring data from a buffer in the storage device to a memory of the storage device protects components of the storage device from over-heating damage while preventing loss of the data.

11. A system for thermal shutdown of a storage device comprising:
   a control circuit for controlling the thermal shutdown of the storage device, wherein the control circuit is configured to:
   determine that a temperature of the storage device is approaching a critical temperature;
   disable input power to the storage device upon determining that the temperature is approaching the critical temperature;
   when the input power to the storage device is disabled, power the storage device with auxiliary power; and
   under the auxiliary power, transfer data from a buffer in the storage device to a memory of the storage device,
   wherein
   the input power is disabled prior to the storage device reaching the critical temperature, and
   the data is transferred during a time margin before the storage device reaches the critical temperature.

12. The system of claim 11, wherein the control circuit is configured to determine for the critical temperature an absolute maximum smart temperature AMST for the storage device.

13. The system of claim 12, wherein the AMST is calculated based on scaling respective maximum temperatures of respective storage device components of the storage device.

14. The system of claim 12, wherein the AMST is calculated based on the following:

$$AMST = a_0 T_0 + a_1 T_1 + a_2 T_2 + \ldots + a_N T_N + \alpha$$

where $a_0, a_1, a_2 \ldots a_N$ are constants, $T_0, T_1, T_2 \ldots T_N$ are the respective actual maximum temperatures of the respective storage device components of the storage device, and $\alpha$ is a constant.

15. The system of claim 12, wherein the control circuit is configured to disable the input power when the temperature of the storage device ranges from 70% to 90% of the AMST.

16. The system of claim 12, wherein the control circuit is configured to disable the input power when the temperature of the storage device ranges from 80% to 95% of the AMST.

17. The system of claim 12, wherein the control circuit is configured to disable the input power when a predicted time before reaching the absolute temperature provides a duration for transfer of the data.

18. The system of claim 11, wherein the control circuit is configured to power the storage device with power from power loss protection capacitors.

19. The system of claim 11, wherein the control circuit is configured to transfer the data to a flash media comprising the memory, thereby protecting the data from loss.

20. A control for thermal shutdown of a storage device, comprising:
   a controller configured to:
   determine that a temperature of the storage device is approaching a critical temperature;
   disable input power to the storage device upon determining that the temperature is approaching the critical temperature;
   when the input power to the storage device is disabled, power the storage device with auxiliary power; and under the auxiliary power, transfer data from a buffer in the storage device to a memory of the storage device, wherein
the input power is disabled prior to the storage device reaching the critical temperature, and
the data is transferred during a time margin before the storage device reaches the critical temperature.

\* \* \* \* \*